Aug. 25, 1942.   C. M. F. FRIDEN   2,294,112
CLUTCH
Original Filed June 2, 1937

INVENTOR
Carl M. F. Friden
BY Harper Allen
ATTORNEY

Patented Aug. 25, 1942

2,294,112

UNITED STATES PATENT OFFICE 2,294,112

CLUTCH

Carl M. F. Friden, Pleasanton, Calif., assignor to Friden Calculating Machine Co., Inc., a corporation of California Original application June 2, 1937, Serial No. 145,979. Divided and this application December 16, 1940, Serial No. 370,255

1 Claim. (Cl. 192—28)

This invention relates to clutch mechanisms and is concerned more particularly with the provision of an improved clutch and clutch control means particularly adapted for use in cyclically operable mechanisms such as calculating machines, for example.

This application is a division of my copending application, Ser. No. 145,979, filed June 2, 1937 and issued as Patent No. 2,279,455 on April 14, 1942, for "Calculating machine."

It is a general object of the invention to provide an improved clutch mechanism.

Another object of the invention is to provide a simple and reliable cyclic clutch means for controlling the drive for calculating machines.

Another object of the invention is to provide a clutch mechanism of the character referred to in which the engaged driving parts can be released freely without interference because of their engaged relation.

Other objects and advantages will be apparent from the following description of a preferred embodiment of the invention as illustrated in the accompanying drawing, in which.

In controlling the drive of cyclically operable calculating machines, it is desirable that the cyclic clutch mechanism be readily moved to and from its engaged position with a minimum of effort and with sufficient rapidity that one or more cycles of operation can be controlled easily irrespective of the high speed operation (from 500 to 1000 R. P. M.) of such machines.

Figure 1:
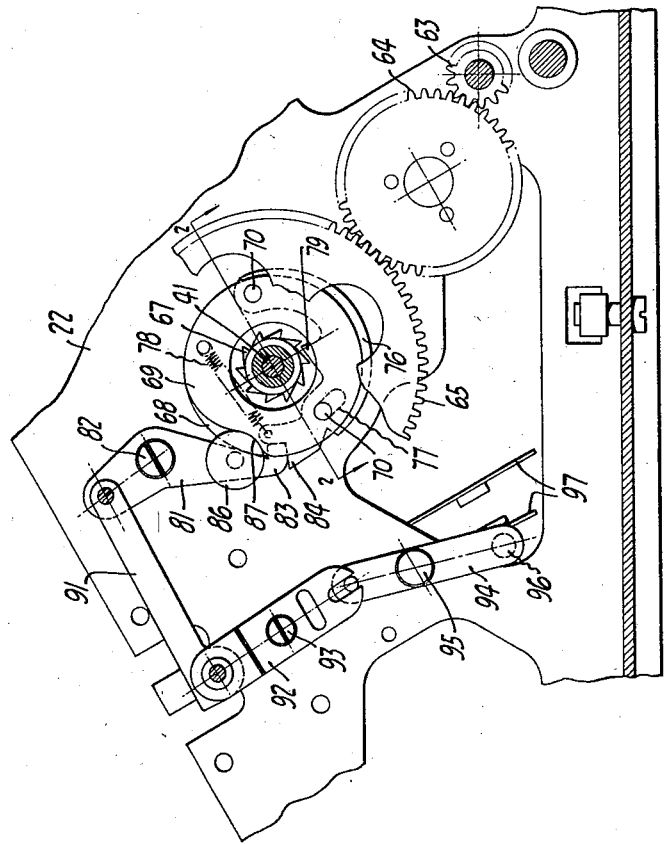
Figure 1 is a fragmentary elevational view partly in section of the drive mechanism of a calculating machine.
Figure 2:
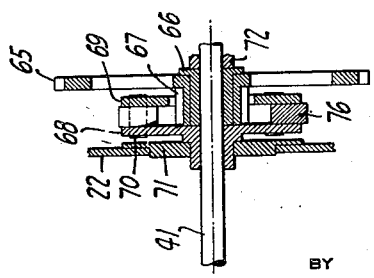
Figure 2 is a sectional view of the clutch taken in the plane of the line 2—2 of Figure 1.

In the embodiment selected for illustration and referring to Figure 1, the mechanism may include a frame plate or supporting structure 22 in which is journaled drive gear 63 of a suitable electric motor or other source of power. Gear 63 is connected by gear 64 with a gear 65. Gear 65 is journaled by flanged collar 66 on a transverse driven shaft 41 and has driving clutch member or ratchet 67 formed on the hub thereof. The driven clutch member comprises disc 68 having its hub pinned on shaft 41 and ring 69 secured in spaced relation from disc 68 by suitable studs 70. Disc 68 is journaled in bearing 71 secured in side plate 22 and engages the hub of gear 65 and the end of collar 66, which has its opposed end in abutting relation with a suitable retaining hub 72 secured on shaft 41.

The driven clutch member carries a drive establishing element in the form of pawl 76 which is pivoted at one end between disc 68 and ring 69 on one of studs 70, and has an arcuate slot 77 adjacent its other end engaged by another of studs 70. Pawl 76 is urged to active position by spring 78 and intermediate its ends has tooth 79 for engagement with the teeth of ratchet 67 to establish the drive connection. Pawl 76 is restrained from movement to active position in the neutral or full cycle position of the parts by clutch control lever 81 pivoted at 82 on side plate 22 and having a nose or stop 83 for engagement with shoulder 84 at the free end of pawl 76. Lever 81 carries roller 86 which seats in depression 87 on ring 69 in the full cycle position thereof, and in the other positions thereof is engaged with the periphery of ring 69 to maintain lever 81 in its clutch engaging position for a purpose later referred to.

It is seen, therefore, that one or more cycles of operation of the actuating mechanism can be determined by oscillation of clutch control lever 81. Simultaneously with movement of control lever 81, the circuit for the drive motor is established by means of link extension 91 of lever 92 pivoted at 93 on side plate 22. At its lower end lever 92 is pivotally associated with lever 94 pivoted at 95 on plate 22 and having pin 96 of insulating material overlapping one of spring contacts 97 of the motor circuit. Thus, movement of clutch control lever 81 simultaneously conditions the clutch and the motor circuit.

Referring to Figure 1, it will be noted that the relative positions of the shoulder 84 on pawl 76, tooth 79, and its pivot 70, is such that the pawl 76 can be freely rocked to disengage tooth 79 from one of the ratchet teeth without an interfering binding action between the engaged teeth. In other words, tooth 79 in moving to disengaged position does not have to cause any reverse movement of the ratchet 67. Also, with the clutch disengaged as shown in Figure 1, the relation of the pivot of the clutch control lever 81 and its nose 83 is such that the lever can be freely rocked to disengaged position without having to effect movement of the dog 76 in process.

I claim:

In a clutch, a cyclically operable shaft, a ratchet journalled on said shaft and driven from a source of power, a driven clutch member secured on said shaft adjacent said ratchet, a spring-urged drive establishing pawl pivoted at one end on said clutch member, means for limiting the pivotal movement of said pawl on said member, a tooth on said pawl intermediate the ends therefor for engagement with said ratchet, a stop movable into and out of the path of the other end of said pawl for controlling the engagement of said tooth with said ratchet, and a roller on said stop and engageable with said driven clutch member for controlling movement of said stop, said driven clutch member having a depression for receiving said roller in the full cycle position of said driven clutch member.

CARL M. F. FRIDEN.